April 6, 1926.　　　　F. SCHARA　　　　1,579,250

PERMUTATION LOCK

Filed Nov. 18, 1922

Inventor
Frank Schara,
H. S. Woodward,
By
Attorney

Patented Apr. 6, 1926.

1,579,250

UNITED STATES PATENT OFFICE.

FRANK SCHARA, OF KANSAS CITY, MISSOURI, ASSIGNOR, BY MESNE ASSIGNMENTS, TO SCHARA MANUFACTURING CORPORATION, OF KANSAS CITY, MISSOURI, A CORPORATION OF MISSOURI.

PERMUTATION LOCK.

Application filed November 18, 1922. Serial No. 601,735.

*To all whom it may concern:*

Be it known that I, FRANK SCHARA, a citizen of Austria, residing at Kansas City, in the county of Jackson and State of Missouri, have invented certain new and useful Improvements in Permutation Locks, of which the following is a specification.

The invention has for an object to effect improvements in permutation locks, and particularly to simplify the structural elements required, to the end that a very cheap lock of this character may be produced. It is an aim to provide a novel lock casing body which is adapted to be machined at a low cost, and also to provide a novel coaction between the elements, as will be readily understood.

Figure 1:
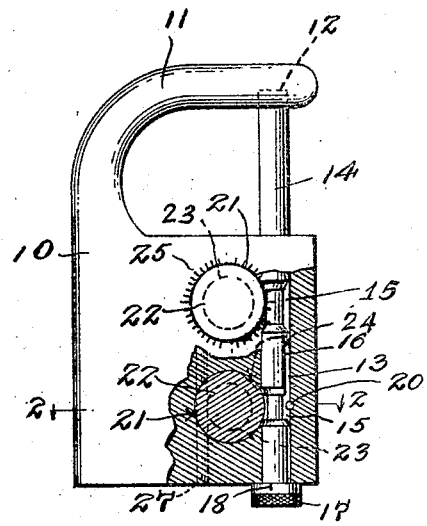
Figure 2:
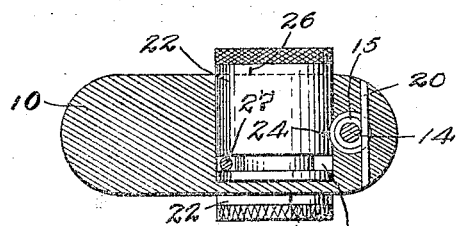
Figure 3:
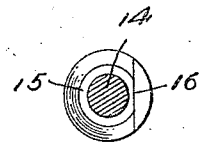
Figure 2A:
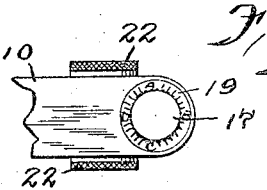

Additional objects, advantages and features of invention reside in the construction, arrangement and combination of parts, as may be understood from the following description and accompanying drawings representing my invention as actually embodied, wherein, Figure 1 is an elevational view of a lock with a part broken away to show the structural form of the tumbler and shackle bolt, Fig. 2 is a cross section on the line 2—2 of Fig. 1, Fig. 2ª is a fragmentary bottom view of the device, Fig. 3 is an enlarged cross sectional view of the shackle bolt.

There is illustrated a lock including a cast body 10, which serves as a casing, of substantially rectangular form as viewed from one side, although this form is not essential. The body also has preferably a considerable thickness, as indicated in Fig. 2, although it may be made much thinner, if desired. Upon the body there is formed a rigid shackle arm 11, which lies in the major plane of the body, extending outwardly from one corner, and then being curved and extended parallel to the body a distance, forming a sort of hook, the end of which stops in or closely adjacent the projection of the side opposite that from which the arm extends.

Upon the inner side of this arm 11 adjacent its extremity, there is formed a circular recess 12, alined with a bore 13 formed through the body in its medial major plane, and receiving slidably and snugly a shackle bolt or pin 14, which comprises a section of cylindrical rod having two circumscribing grooves 15 and a flat face 16, as will be explained. The bolt 14 is formed with a knurled head 17, while upon the inner part a peripheral notch 18 is formed. The pin is of a length to permit the head to engage snugly against the bottom face of the body 10, and formed upon the base, concentric with the pin there is a scale 19, which may be provided with alphabetical characters, as shown. The grooves 15 in the pin 14 are positioned on the pin so that they will lie within the case body 10 when the pin 14 is pressed inward fully. The flat face 16 extends from the groove 15 nearest the head longitudinally toward the other groove a distance, but stopping short of the other groove. A ward and retaining pin 20 is engaged in the body 10 extending across the bore 13 close to one side and in a position intermediately of the outer groove 15 next the head of the pin. Plain circular recesses 21 are formed in the side or sides of the body 10 in such manner that their perimetral walls intersect the bore 13, and if desired, the recesses may be on opposite sides of the body 10. Inserted in each of the recesses 21, there are respective rotating tumblers 22, each of which comprises a section of plain cylindrical stock having a circumscribing groove 23, and a small notch 24 spaced longitudinally from the groove and located intermediately upon the tumbler, so formed that when turned to a position next the bore 13, the notch will aline with and form a continuation of the bore. The tumblers are sufficiently large to project from the face of the body 10 a distance, the extreme outer peripheral portion being knurled and a pointer notch 26 being formed thereon immediately adjacent the casing body, to cooperate with a numerical scale 25 marked upon the face of the body 10 concentrically with each respective tumbler. The grooves of the tumblers may be alined so that both may be secured by a single retaining pin 27. The tumblers 22 are fitted so that their peripheries snugly fit between the sides of the grooves 15 of the pin 14, except when the notches 24 of the tumblers are alined with the bore 13. The flat face 16 of the pin 14 extends only for part of the depth of the groove 15 there adjacent, so that when this flat face is turned toward the tumblers, the adjacent tumbler will still engage the side of the groove 15 next to the flat face and prevent longitudinal movement of the pin 14.

In use, in order to open the lock after being closed as shown in Fig. 1, it is only necessary to turn the tumblers so as to bring their notches 24 into alinement with the bore 13, and turn the pin 14 to the position shown in Fig. 1, when it may be withdrawn. It will be seen that the pin is capable of being turned at all times, and so may the tumblers 22, except when the pin has been partly withdrawn, and in this way, delay in closing the lock may be avoided, as it cannot be locked in open position.

The parts are adapted to be produced readily by very simple manufacturing processes, so that the lock may be put upon the market at a very low price.

What is claimed is:—

1. In a lock of the character described, a body case having a bore formed therein, a bolt slidable in the bore and revoluble therein at times, said bolt having a circumscribing groove and a flat face parallel to its axis extending from the groove a distance longitudinally, a rotatable cylindrical tumbler mounted in the body with its periphery adapted to extend into said groove and having a notch to aline with said bore at times, means to retain the tumbler, and a retainer for the bolt positioned to engage in the groove and closely adjacent the flat face for the purposes described.

2. In a lock of the character described, a body having a plain cylindrical bore therethrough, a lock bolt slidable therethrough having a wide circumscribing groove and an inset flat face extending longitudinally from the groove a distance, an operating head on the bolt opposite its lock end for rotation and reciprocation adapted to set snugly against the body in shot position, a rotating tumbler of cylindrical form, mounted in the body to intersect the bore in line with said groove of the bolt and having a notch to aline with the bore at times, means to retain the tumbler, and a ward and retaining pin engaged in the body across said bore at a distance from the side at which the tumbler intersects said bore for movement of the flat face closely beside the pin at times and rotation of the bolt at other times.

3. In a lock of the character described, a flat case body of substantial thickness, a cylindrical bore therein in its medial plane and cylindrical recesses in opposite sides intersecting the bore, a bolt slidable in the bore having circumscribing grooves to aline with said recesses, an inset flat face being formed on the bolt extending longitudinally from one of said grooves, a ward and retaining pin fixed in the body across the bore for alinement with the last named groove when this groove is alined with the respective recess whereby the flat face may move beside the pin at times and the bolt rotate at other times; rotatable tumblers set in the recesses having notches adapted to aline with the bore at times, and having mutually alined circumscribing grooves spaced from the notches, and a retaining pin fixed in the body and engaged commonly in the last named grooves.

In testimony whereof I have affixed my signature.

FRANK SCHARA.